United States Patent
Ray et al.

(10) Patent No.: US 11,080,555 B2
(45) Date of Patent: Aug. 3, 2021

(54) CROWD SOURCED TRENDS AND RECOMMENDATIONS (71) Applicant: International Business Machines Corporation, Armonk, NY (US)

(72) Inventors: Shubhadip Ray, Secaucus, NJ (US); John David Costantini, Jersey City, NJ (US); Avik Sanyal, Kolkata (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 16/561,235

(22) Filed: Sep. 5, 2019

(65) Prior Publication Data

US 2021/0073576 A1 Mar. 11, 2021

(51) Int. Cl.
*G06K 9/62* (2006.01)
*G06N 5/04* (2006.01)
*G06Q 10/08* (2012.01)
*G06F 16/9535* (2019.01)
*G06Q 30/02* (2012.01)

(52) U.S. Cl.
CPC ....... *G06K 9/6218* (2013.01); *G06F 16/9535* (2019.01); *G06N 5/04* (2013.01); *G06Q 10/087* (2013.01); *G06Q 30/0205* (2013.01)

(58) Field of Classification Search
CPC .... G06K 9/6218; G06F 16/9535; G06N 5/04; G06Q 10/087; G06Q 30/0205
See application file for complete search history.

(56) References Cited

U.S. PATENT DOCUMENTS

| | | | |
|---|---|---|---|
| 7,840,377 B2 | 11/2010 | Ramsey et al. | |
| 9,070,171 B2 | 6/2015 | Guo et al. | |
| 9,805,381 B2 * | 10/2017 | Frank | G06F 16/24578 |
| 10,198,505 B2 * | 2/2019 | Frank | G06F 16/337 |
| 2009/0240556 A1 * | 9/2009 | Angell | G06Q 30/02 705/7.29 |
| 2009/0281922 A1 | 11/2009 | Childress et al. | |
| 2012/0124458 A1 * | 5/2012 | Cruzada | H04L 51/32 715/205 |
| 2015/0058079 A1 | 2/2015 | Freund et al. | |
| 2016/0086104 A1 | 3/2016 | Inouhaybi et al. | |
| 2017/0011452 A1 | 1/2017 | Beckham | |
| 2018/0013713 A1 | 1/2018 | Do et al. | |

\* cited by examiner

*Primary Examiner* — Gregory M Desire
(74) *Attorney, Agent, or Firm* — Yee & Associates, P.C.

(57) ABSTRACT

Detecting trends is provided. The method comprises receiving, from a number of data sources, data regarding choices of people at a number of specified events and public places and determining, according to a number of clustering algorithms, trend clusters according to data received from the data sources cross-referenced to defined event types and place types. Customer profile data and preferences are received from a number of registered customers through user interfaces, and a number of customer clusters according to the customer profile data and preferences are determined according to clustering algorithms. Correlation rules are calculated between the trend clusters and the customer clusters. A number of trend predictions and recommendations are then sent to a user regarding a number of specified events or time frames according to the correlation rules.

22 Claims, 5 Drawing Sheets

CROWD SOURCED TRENDS AND RECOMMENDATIONS

BACKGROUND

The disclosure relates generally to determining and predicting fashion trends based on crowd sourced information about clothing choices at specific events and locations, and more specifically to making customized recommendations on fashion choices according to the fashion trends.

Fashion trends evolve over time and are often cyclical. Fashion trends can also be specific to types of events, for example a horse race versus a basketball game or an art gallery exhibition. Some individuals prefer to follow fashion trends, whereas others prefer to differentiate themselves from the trends. However, to follow or differ from fashion trends, one must first know what those trends are.

The growth of social media, image, and video recognition, and internet of things (IoT) technology provides a rich and growing source of fashion information from a variety of sources and covering an ever-widening variety of event types, locations, and other settings.

Modern cognitive computing technologies such as IBM Watson® can leverage artificial intelligence, machine learning, dialog, computer visions, and natural language understanding for enhancing fashion e-commerce portals. IBM Cognitive Fashion technologies can make such e-commerce portals similar to in-store experiences to assist customers in finding the right product of choice without spending hours searching portals.

SUMMARY

An illustrative embodiment provides a computer-implemented method. The method comprises receiving, from a number of data sources, data regarding choices of people at a number of specified events and public places and determining, with clustering algorithms such as k-means clustering, trend clusters according to data received from the data sources cross-referenced to defined event types and place types. Customer profile data and preferences are received from a number of registered customers through user interfaces, and a number of customer clusters according to the customer profile data and preferences are determined with clustering algorithms such as k-means clustering. Correlation rules are derived between the trend clusters and the customer clusters with correlation techniques. A number of trend predictions and recommendations are then sent to a user regarding a number of specified events or time frames according to the correlation rules.

Another illustrative embodiment provides a computer program product. The computer program product comprises a non-volatile computer readable storage medium having program instructions embodied therewith, the program instructions executable by a number of processors to cause the computer to perform the steps of: receiving, from a number of data sources, data regarding choices of people at a number of specified events and public places; determining, with clustering algorithms such as k-means clustering, a number of trend clusters according to data received from the data sources cross-referenced to defined event types and place types; receiving, from a number of registered customers, customer profile data and preferences; determining, with clustering algorithms like k-means clustering, a number of customer clusters according to the customer profile data and preferences; calculating correlation rules between the trend clusters and the customer clusters; and sending, according to the correlation rules, a number of trend predictions and clothing recommendations to a user regarding a number of specified events or time frames.

Another illustrative embodiment provides a system. The system comprises a bus system; a storage device connected to the bus system, wherein the storage device stores program instructions; and a number of processors connected to the bus system, wherein the number of processors execute the program instructions to: receive, from a number of data sources, data regarding choices of people at a number of specified events and public places; determine, with clustering algorithms such as k-means clustering, a number of trend clusters according to data received from the data sources cross-referenced to defined event types and place types; receive, from a number of registered customers, customer profile data and preferences; determine, with clustering algorithms such as k-means clustering, a number of customer clusters according to the customer profile data and preferences; calculate correlation rules between the trend clusters and the customer clusters; and send, according to the correlation rules, a number of trend predictions and clothing recommendations to a user regarding a number of specified events or time frames.

DETAILED DESCRIPTION

The illustrative embodiments recognize and take into account one or more different considerations. Illustrative embodiments recognize and take into account that fashion trends evolve over time and can be specific to types of events. Illustrative embodiments also recognize and take into account that some individuals prefer to follow fashion trends, whereas others prefer to differentiation themselves from the trends.

Illustrative embodiments recognize and take into account that the growth of social media, image recognition, and internet of things (IoT) technology provides a rich and growing source of fashion information from a variety of sources and covering an ever-widening variety of event types, locations, and other settings. However, this volume of information can be overwhelming and impossible for the human mind to organize and sort, let alone predict and stay ahead of the trends.

Illustrative embodiments provide a method of analyzing and discovering emerging fashion trends. Video and social media posts from public places and events are captured in real-time and analyzed to discover clothing choices and emerging fashion trends, especially in connection with specific types of events and places.

In addition, smart tags or other similar sensors can be incorporated into garments (e.g., in the label) by manufacturers and/or retailers. These tags can provide IoT product information in real-time regarding the choice of clothing items. Registered users can opt in to provide such information from clothing smart tags whether they are helping to set fashion trends or receive recommendations according to trends as they choose and select clothing items to buy and/or wear.

For example, so-called social media "influencers" might opt in to provide smart tag information about their fashion choices, which can supplement fashion trend data and analysis derived from news media and social media sources. As another example, consumers intending to attend a specific event or type of event can opt in to have clothing items they try on at a store provide smart tag IoT product data, which in turn to help to provide recommendations for choices or matching according to a user's preference to follow or differ from detected fashion trends. Furthermore, shoppers might also receive notification if other registered users planning to attend the same event have already purchased the same or similar items.

For clothing manufacturers and retailers, the same fashion trends derived from public video/images, social media, smart tags, and IoT sensors regarding actual items tried on and/or purchased by customers can be used to make manufacturing choices, inventory decisions, and advertising/promotions. The analytics can indicate fashion preferences given to certain types of events/venues and age groups. Styles can be chosen and changed according to predicted and emerging trends, and promotions, sales, and marketing directed to specific consumer groups, including attendees of upcoming events.

Therefore, fashion trend analyses and predictions provided by the illustrative embodiments can provide customized information and recommendations for both the supply side (manufacturers/retailers) and demand side (customers) of the fashion industry.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 1:
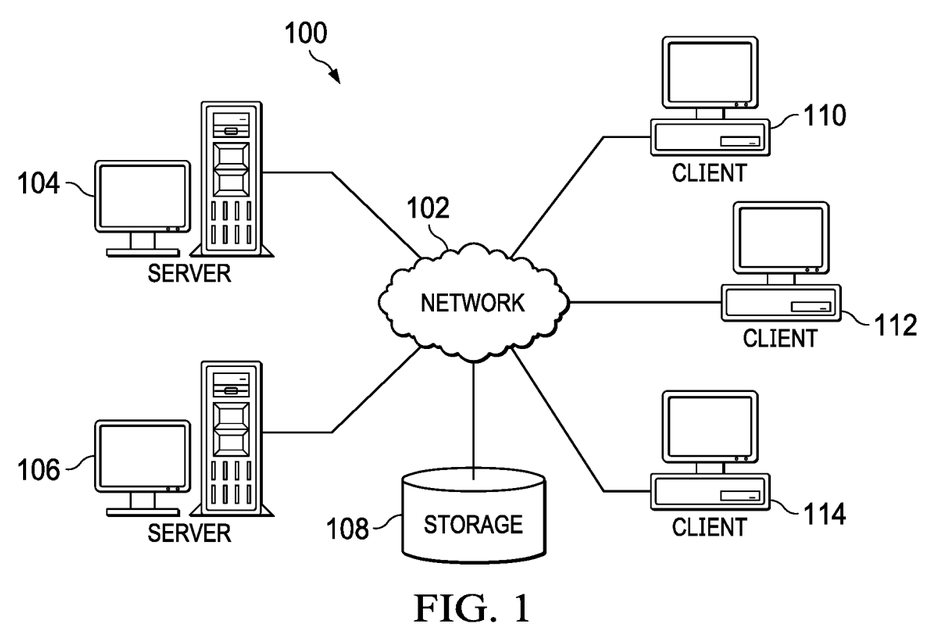
FIG. 1 depicts a pictorial representation of a network of data processing systems in which illustrative embodiments can be implemented.

FIG. 1 depicts a pictorial representation of a network of data processing systems in which illustrative embodiments can be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, smart tags, IoT sensors, and the like. Users of clients 110, 112, and 114 may utilize clients 110, 112, and 114 to access system of records corresponding to one or more enterprises, via the connector services provided by server 104 and server 106, to perform different data operations. The operations may be, for example, retrieve data, update data, delete data, store data, and the like, on the system of records.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage unit 108 may store other types of data, such as authentication or credential data that may include user names, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
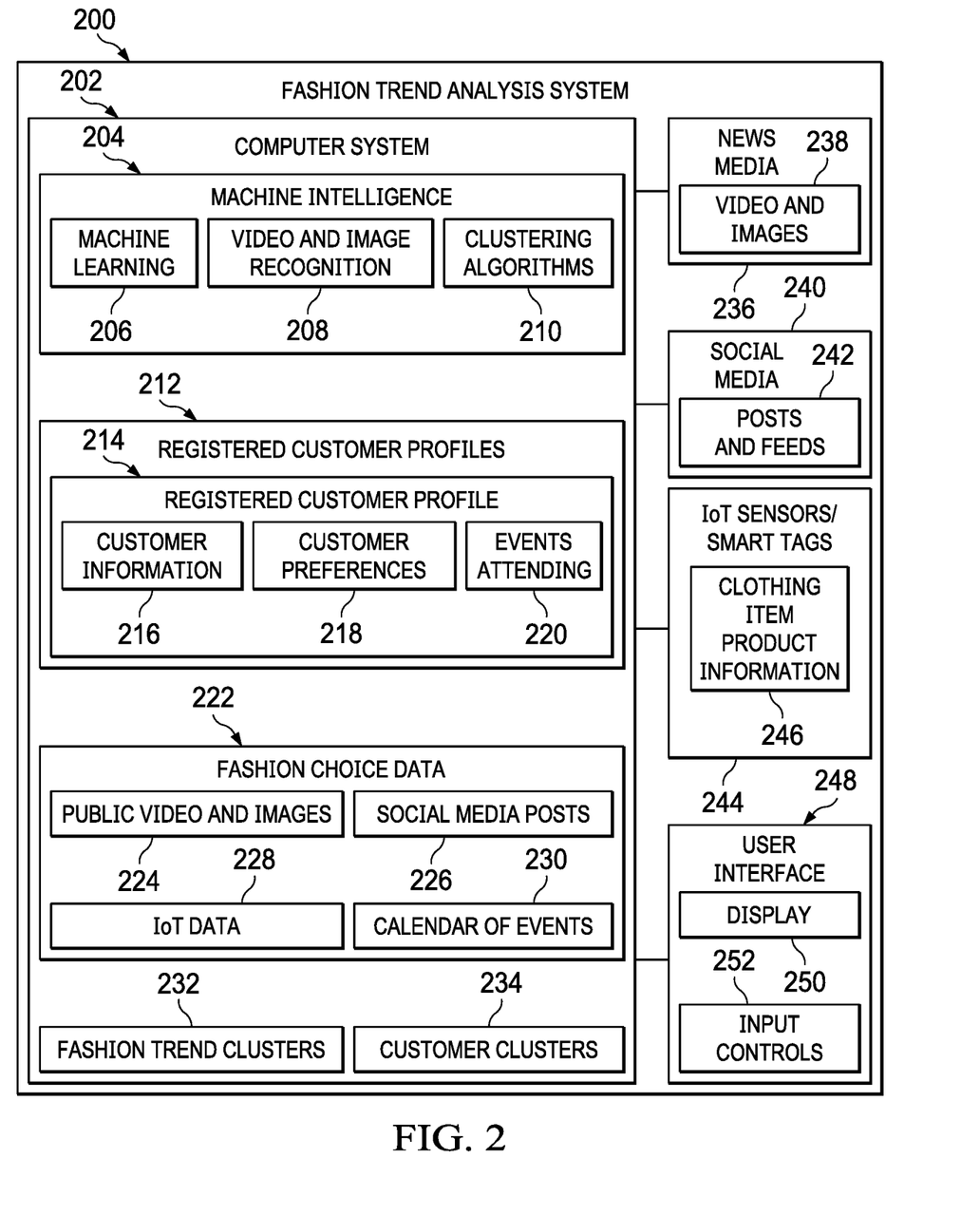
FIG. 2 illustrates a block diagram of a system for detecting fashion trends in accordance with an illustrative embodiment.

FIG. 2 illustrates a block diagram of a system for detecting fashion trends in accordance with an illustrative embodiment. Fashion trend analysis system 200 can be implemented using the network elements shown in FIG. 1. For example, computer system 202 might comprise a server such as server 106. Similarly, news media 236, social media 240, IoT sensors 244, and client interface 248 might comprise, operate on, or receive data from network client devices, such as client 110, communicating over a network such as network 102. News media 236 and social media 240 might also comprises servers, such as server 106, that receive data from client devices, such as clients 110, 112, 114.

Computer system 202 comprises machine intelligence 204 running on a number of processors. Machine intelligence 204 comprises machine learning 206, video and image recognition 208, and clustering algorithms 210. Examples of clustering algorithms include, without limitation, k-means clustering, mean-shift clustering, density-based spatial clustering of applications with noise (DBSCAN), ordering points to identify the clustering structure (OPTICS), expectation-maximization clustering, Gaussian mixture models, and hierarchical clustering.

Machine intelligence 204 can be implemented using one or more systems such as an artificial intelligence system, a neural network, a Bayesian network, an expert system, a fuzzy logic system, a genetic algorithm, or other suitable types of systems. Machine learning 204, video and image recognition 208, and clustering algorithms 210 can make computer system 200 a special purpose computer for dynamic predictive modelling of fashion trends. In the illustrative embodiment, machine intelligence 204 can be implemented in software, hardware, firmware or a combination thereof. When software is used, the operations performed by machine intelligence 204 can be implemented in program code configured to run on hardware, such as a processor unit. When firmware is used, the operations performed by machine intelligence 204 can be implemented in program code and data, and stored in persistent memory to run on a processor unit. When hardware is employed, the hardware may include circuits that operate to perform the operations in machine intelligence 204.

Computer system 202 also comprises registered customer profiles 212. Each customer profile 214 comprises customer information 216 unique to the user, similar to a social media account. A customer can provide as much or a little information as the customer chooses, with the understanding that more information allows computer system 202 to determine more customized recommendations. Customer profile 214 can also comprises customer preferences 218 regarding fashion trends, including a desire to follow certain trends or deliberately differ from trends (i.e. "swim against the stream"). Customer profile 214 might also include entries for specific events 220 which the customer is planning to attend. Information regarding specific events allows computer system 202 to accommodate customer preferences 218 but to do so according to specific contexts.

Computer system 202 comprises fashion choice data 222 provided from a number of data sources. Fashion choice data 222 might comprise public video and images 224, social media posts/feeds 226, IoT data 228, and a calendar of public events 230 against which the other data can be cross-referenced. Put simply, fashion choice data 222 allows computer system 202 to determine who is wearing what to where and when. It should be emphasized that fashion choice data 222 comprises publicly available and/or information voluntarily supplied by users.

By applying machine intelligence 204 to registered customer profiles 212 and fashion choice data 222, computer system 202 generates fashion trend clusters 232 and customer clusters 234, explained in more detail below.

Computer system 202 receives data from a variety of input sources. New media 236 reporting on special events provide a rich source of video and images 238 of what fashions people are wearing to different kinds of events, and how fashion choices change over time. In addition, media stories might also specifically identify designers and/or styles worn by celebrities at certain events.

Social media 240 provides an increasingly steady input of posts and feeds 242. In addition to providing images of fashion choices, social media posts and feeds 242 often specifically identify people, events, locations, fashions, designers, etc.

Fashion information can also be provided by IoT sensors/smart tags 244 embedded in clothing that can provide clothing item product information 246. For example, smart tags 244 can be embedded in garments by retailers or clothing manufacturers, e.g., in labels. Examples of possible product information 246 include item type, material, color, manufacturer, product code, and retail price.

The IoT sensors/smart tags 244 can provide fashion information in several contexts. If registered customers are appearing in new media 236 or social media 240, they might opt in to allow smart tags 244 to provide information over the Internet about the clothes they are wearing as a way to promote the clothes. In this context, the product information 246 provided by the tags 244 can supplement visual information in media video and images 238 and social media feeds 242 and can be cross-references with the visual information to improve the accuracy of visual recognition 208 in machine intelligence 204. In another context, smart tags or IoT sensors 244 in the form of haptic sensors can detect what clothing items a registered customer is trying on, which can be cross-referenced to fashion trends and other customers in order to provide recommendations, explained in more detail below.

User interface 248 allows customers/users to register accounts with computer system 202 and create user profiles 212. Input controls 252 allow for the entry of customer information 216, preferences 218, and events the customer is planning to attend 220. Display 250 can provide the customer/user with fashion recommendations from computer system 202. User interface 248 can operate on any Internet enabled devices such as a desktop or laptop computer, smart phone, tablet computer, smart watch, etc.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, one or more technical solutions are present that overcome a technical problem of detecting and predicting fashion trends and providing recommendations to consumers and/or producers regarding such trends.

Figure 3:
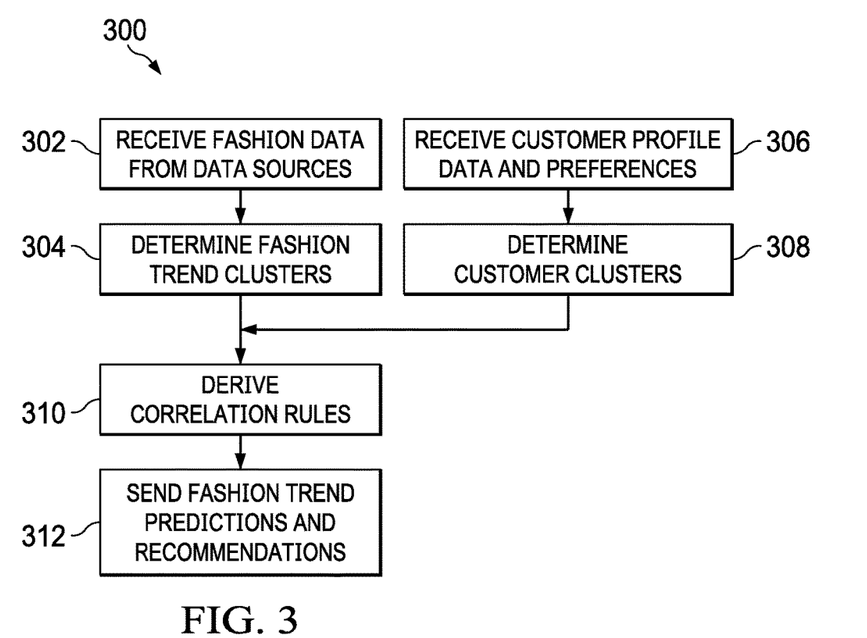
FIG. 3 depicts a flowchart of a process for detecting fashion trends and making recommendations in accordance with illustrative embodiments.

FIG. 3 depicts a flowchart of a process for detecting fashion trends and making recommendations in accordance with illustrative embodiments. Process 300 can be implemented by a computer system such as computer system 202 shown in FIG. 2. The computer system receives data regarding fashion choices of people at a number of specified events and public places from a number of data sources (step 302). The computer system determines, according to a number of clustering algorithms, a number of fashion trend clusters according to data received from the sensors cross-referenced to defined event types and place types (step 304).

The computer system also receives customer profile data and preferences from the number of registered customers through user interfaces (step 306) and determines, according to a number of clustering algorithms, customer clusters according to the customer profile data and preferences (step 308).

The system then derives correlation rules between the fashion trend clusters and the customer clusters (step 310). The granularity with which the correlation rules are derived can be broken down to the individual level. Therefore, within each fashion trend cluster and within each customer cluster, the system can correlate a specific clothing choice and event with a specific person. Therefore, if the system knows a specific person wore a specific clothing combination to an event at a specific time and place, this information can be used in deriving correlation rules. In some cases, the specific fashion choice in question might be the center of a fashion trend cluster or the beginning of a fashion trend, such as at a fashion show. The specific individual might also be the center of a customer cluster or highly influential on customer clusters such as a celebrity or social media influencer.

Using these correlation rules, the system sends fashion trend predictions and recommendations to a user regarding a number of specified events or time frames (step 312). These fashion predictions and recommendations might comprise recommendations to registered customers who are shopping for clothes or simply selecting an outfit for an event. On the supply side, the recommendations might comprise providing promotion recommendations to retailers directed toward specific customer clusters and/or inventory recommendations to retailers according to predicted demand. The system might also send manufacturing recommendations to manufacturers according to fashion trend predictions.

Figure 4:
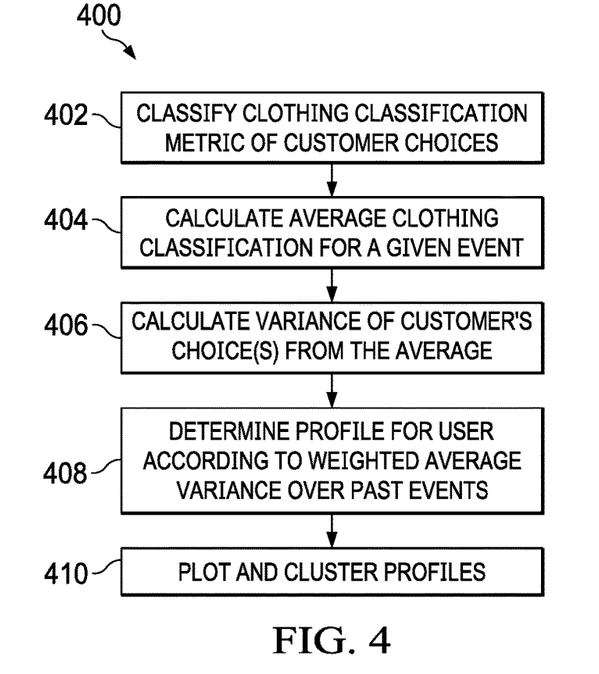
FIG. 4 depicts a flowchart of a process for determining customer clusters in accordance with illustrative embodiments.

FIG. 4 depicts a flowchart of a process for determining customer clusters in accordance with illustrative embodiments. Process 400 is a more detailed explanation of step 308 in FIG. 3. Process 400 begins by processing a clothing classification metric of customer choices for each article of clothing chosen (step 402). This metric can be calculated by product data supplied by a smart tag or haptic sensor in clothing items a user decides to wear to an event or has already worn to past events. Haptic sensors incorporate tactile sensors that can measure forces exerted by users. They are often used in virtual reality interfaces to simulate manipulation of simulated three-dimensional objects but can also be employed to detect and measure tactile and kinesthetic manipulation of clothing items by a user.

The clothing classification metric can be calculated according to the equation:

$$X_j = \beta_{1j}[\text{color}] + \beta_{2j}[\text{style}] + \beta_{3j}[\text{pattern}] + \beta_{4j}[\text{material}] + \beta_{5j}[\text{brand}] + \beta_{6j}[\text{surprise factor}] + \ldots + \beta_{nj}[\ldots]$$

where, i is an index for specific public events (e.g., Coachella, Glastonbury, Preakness Stakes, New York Fashion Week, the Super Bowl, events people check into on social media, etc.)

j is an index for an article of clothing worn or tried on (e.g., shirt, dress, shorts, trousers, shoes, etc.), and β is a descriptive parameter of the item Process 400 then calculates an average clothing classification, $\overline{X}_{ij}$, for a given event (step 404). $\overline{X}_{ij}$ is the average classification metric for a given event i and article of clothing j based on collected data from past iterations of an event or recent iterations of a similar event i.

A variance of the customer's choice(s) from the average is then calculated (step 406). The variance can be calculated according to the equation:

$$\phi_i^2 = [\Sigma(X_j - \overline{X}_{ij})^2]/N$$

where N is the number of articles of clothing in an outfit.

The variance measures the degree to which an attendee's outfit (i.e. collection of articles of clothing j) differs from what is commonly worn to a given event or type of event.

A profile, P, for a user, Q, is then determined by taking the weighted average variance of that person's clothing choices over past events (step 408). The weighted average can be calculated according to the equation:

$$P_Q = \Sigma \lambda_r * \phi_i^2 / M$$

where r represents all past event data points available, and M is the total number of events with data available for user/customer Q's clothing choices.

The profile $P_Q$ can be updated over time as the person Q makes new clothing choices for new events. The system can evaluate and compare the user Q's clothing choices to clothing choices of event attendees as a whole. The weights on the variances are higher for more recent events (lower r value) and lower for event that occurred farther in the past (high r value). This weighting enables more recent user choices to more strongly impact recommendations and decisions by the predictive model. Profiles for a number of users are plotted in a fashion choice grid and clustered (step 410).

Figure 5:
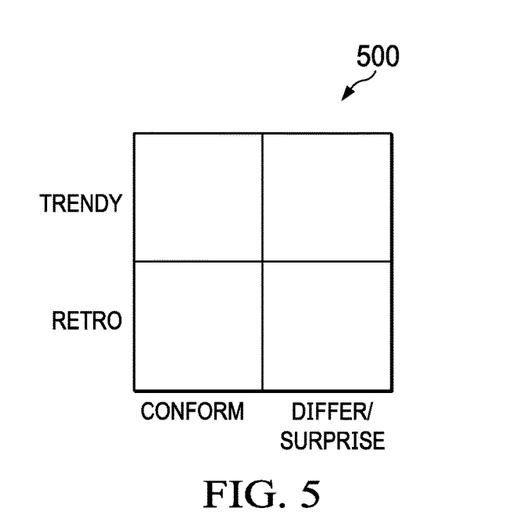
FIG. 5 depicts a customer fashion choice grid in accordance with illustrative embodiments.

FIG. 5 depicts a customer fashion choice grid in accordance with illustrative embodiments. In the example shown, fashion grid 500 is a dimension grid that includes customer profile on the X axis (ranging from conform to differ/surprise) and style on the Y axis (ranging from trendy to retro). It should be emphasized that additional dimensions can be used, and the simple two-dimensional example in FIG. 5 is presented for ease of illustration of the underlying concept. Grid 500 illustrates one dimension for clustering. Similar plotting can be performed for other dimensions of a decision-making engine (such as machine learning 206). Clustering of customers can be performed using algorithms such as k-means clustering, mean-shift clustering, density-based spatial clustering of applications with noise (DBSCAN), ordering points to identify the clustering structure (OPTICS), expectation-maximization clustering, Gaussian mixture models, and hierarchical clustering.

Figure 6:
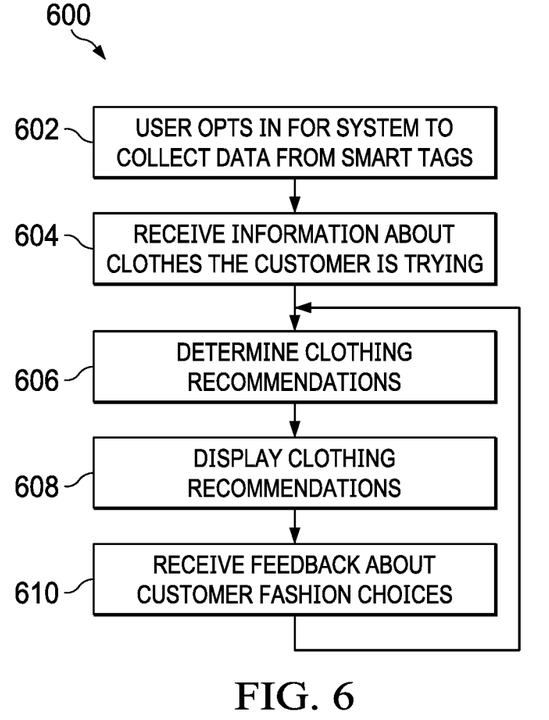
FIG. 6 depicts a flowchart of a process for providing fashion recommendations to customers in accordance with illustrative embodiments.

Referring back to step 310 in FIG. 3, variance rules Rd can be generated with correlation techniques specific to event i and location 1, which differentiate customers into people trying to wear similar clothing choices to others attending an event, people trying to differentiate themselves from others at the event, etc. The decision to follow or buck fashion trends can also be set manually by a customer, e.g., in the customer preferences 218. For example, If $P_Q > R_{i1}$: Max($\Phi^2 i$) for person Q
If $P_Q < R_{i1}$: Min($\Phi^2 i$) for person Q
If $P_Q \approx R_{i1}$: Median($\Phi^2 i$) for person Q FIG. 6 depicts a flowchart of a process for providing fashion recommendations to customers in accordance with illustrative embodiments. Process 600 is a more detailed explanation of step 312 in FIG. 3. Recommendations of clothing choices can be determined by finding combinations of items that fall into a like profile cluster for a given user/customer and a specific event or event type.

Process 600 can be initiated by a registered customer logging in to an account and opting to allow collection of information from smart tags or haptic sensors in clothing items that use tries on (step 602). As the customer selects and tries on different clothing items, the system receives information about the items in which the sensors/tags are incorporated (step 604).

Applying correlation rules and user preferences in the customer profile, the system determines clothing recommendations for the customer (step 606) and displays the clothing recommendations to the customer through an interface display (step 608).

The system receives feedback about actual fashion choices made by the customer (step 610), which can be used to refine future predictions. The user might enter the clothing choices through the interface at the time of selected. The system can also gather information on actual decisions made by the users regarding outfit choices for a particular event from data collected from smart tags, haptic IoT sensors or videos, images from events, etc. and fed directly back into the machine learning model. The model can re-evaluate a user profile with each iteration of fashion choice. User feedback can be in the form of later fashion choices. The β value weights in the clothing classification metric algorithm are calculated to minimize the difference between the predicted clothing classification metric and the actual clothing classification metric for an outfit which is chosen with consideration to the users' known and inferred preferences. This loop can act as a mechanism for the algorithm to self-learn and continuously trains this algorithm.

Figure 7:
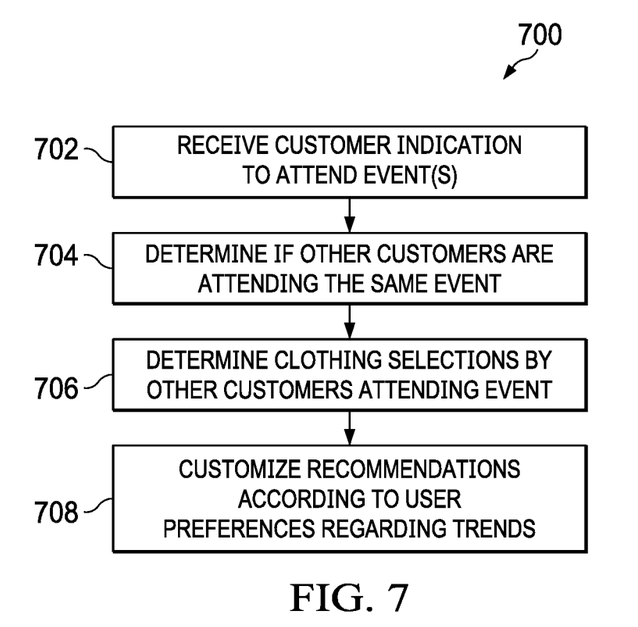
FIG. 7 depicts a flowchart of a process for customizing fashion recommendations for specific events in accordance with illustrative embodiments.

FIG. 7 depicts a flowchart of a process for customizing fashion recommendations for specific events in accordance with illustrative embodiments. Process 700 expands upon step 606 in FIG. 6 for a specific context. Process 700 begins with the registered customer/user indicating an intent to attend a specific number of events (step 702). The system determines if other registered customers have also indicated an intent to attend the same event (step 704).

As the customer tries on and selects clothing items, the system cross-references other customer profiles to determine clothing selections/purchases made by other registered users attending the event (step 706). The system will then customize clothing recommendations for the customer according to the customer's preferences to follow or differ from (surprise) the fashion trends and choices of other event attendees (step 708).

Figure 8:
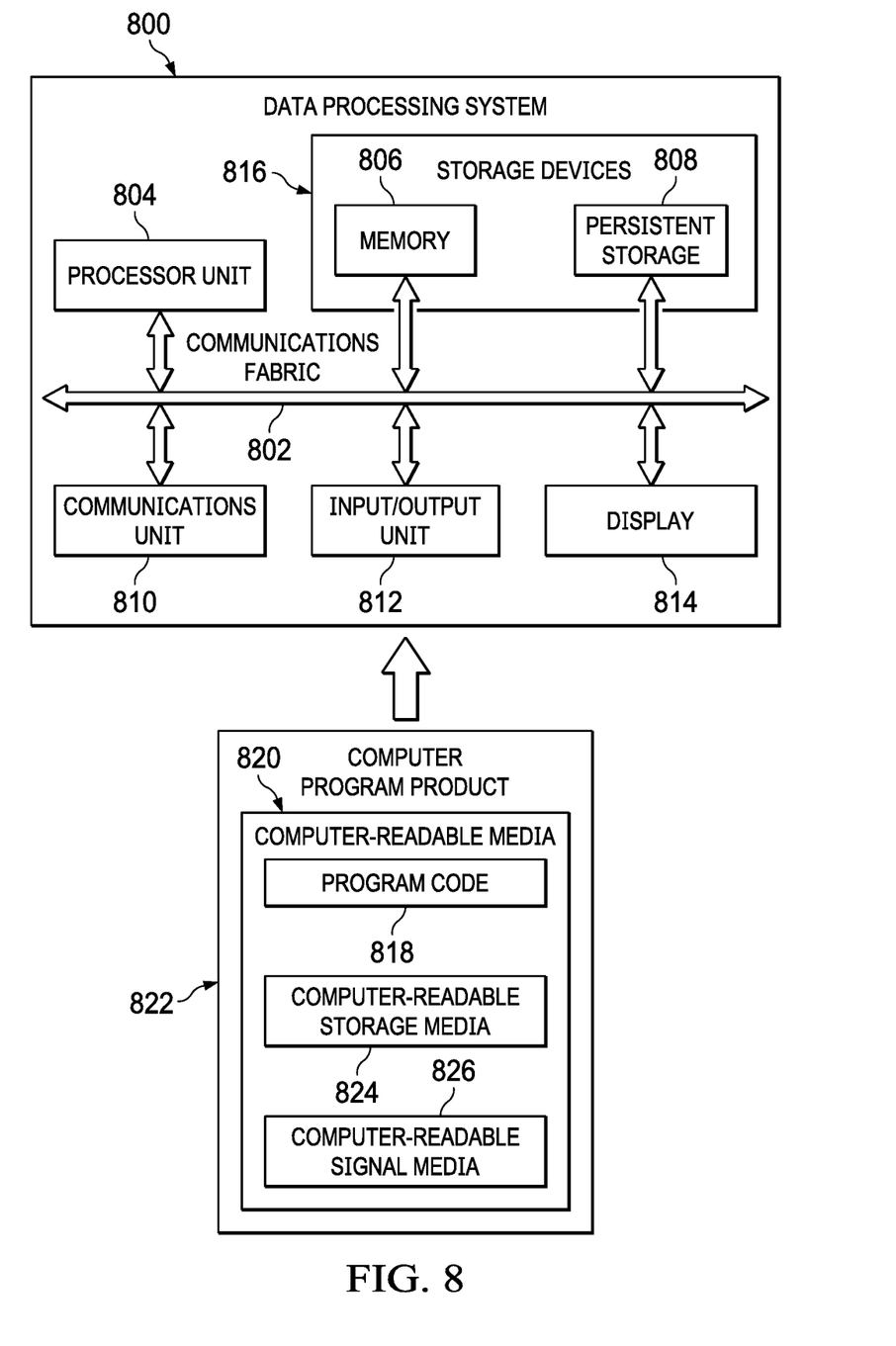
FIG. 8 is a diagram of a data processing system is depicted in accordance with an illustrative embodiment.

Turning to FIG. 8, a diagram of a data processing system is depicted in accordance with an illustrative embodiment. Data processing system 800 is an example of a system in which computer-readable program code or program instructions implementing processes of illustrative embodiments may be run. Data processing system 800 may be an example of one system in which server 104 or client 112 in FIG. 1 can be implemented. In this illustrative example, data processing system 800 includes communications fabric 802, which provides communications between processor unit 804, memory 806, persistent storage 808, communications unit 810, input/output unit 812, and display 814.

Processor unit 804 serves to execute instructions for software applications and programs that may be loaded into memory 806. Processor unit 804 may be a set of one or more hardware processor devices or may be a multi-processor core, depending on the particular implementation. Further, processor unit 804 may be implemented using one or more heterogeneous processor systems, in which a main processor is present with secondary processors on a single chip. As another illustrative example, processor unit 804 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 806, in these examples, may be, for example, a random access memory, or any other suitable volatile or non-volatile storage device. Persistent storage 808 may take various forms, depending on the particular implementation. For example, persistent storage 808 may contain one or more devices. For example, persistent storage 808 may be a hard drive, a flash memory, a rewritable optical disk, a rewritable magnetic tape, or some combination of the above. The media used by persistent storage 808 may be removable. For example, a removable hard drive may be used for persistent storage 808.

Communications unit 810, in this example, provides for communication with other computers, data processing systems, and devices via network communications unit 810 may provide communications using both physical and wireless communications links. The physical communications link may utilize, for example, a wire, cable, universal serial bus, or any other physical technology to establish a physical communications link for data processing system 800. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 800.

Input/output unit 812 allows for the input and output of data with other devices that may be connected to data processing system 800. For example, input/output unit 812 may provide a connection for user input through a keypad, keyboard, and/or some other suitable input device. Display 814 provides a mechanism to display information to a user and may include touch screen capabilities to allow the user to make on-screen selections through user interfaces or input data, for example.

Instructions for the operating system, applications, and/or programs may be located in storage devices 816, which are in communication with processor unit 804 through communications fabric 802. In this illustrative example, the instructions are in a functional form on persistent storage 808. These instructions may be loaded into memory 806 for running by processor unit 804. The processes of the different embodiments may be performed by processor unit 804 using computer-implemented program instructions, which may be located in a memory, such as memory 806. These program instructions are referred to as program code, computer-usable program code, or computer-readable program code that may be read and run by a processor in processor unit 804. The program code, in the different embodiments, may be embodied on different physical computer-readable storage devices, such as memory 806 or persistent storage 808.

Program code 818 is located in a functional form on computer-readable media 820 that is selectively removable and may be loaded onto or transferred to data processing system 800 for running by processor unit 804. Program code 818 and computer-readable media 820 form computer program product 822. In one example, computer-readable media 820 may be computer-readable storage media 824 or computer-readable signal media 826. Computer-readable storage media 824 may include, for example, an optical or magnetic disc that is inserted or placed into a drive or other device that is part of persistent storage 808 for transfer onto a storage device, such as a hard drive, that is part of persistent storage 808. Computer-readable storage media 824 also may take the form of a persistent storage, such as a hard drive, a thumb drive, or a flash memory that is connected to data processing system 800. In some instances, computer-readable storage media 824 may not be removable from data processing system 800.

Alternatively, program code 818 may be transferred to data processing system 800 using computer-readable signal media 826. Computer-readable signal media 826 may be, for example, a propagated data signal containing program code 818. For example, computer-readable signal media 826 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 818 may be downloaded over a network to persistent storage 808 from another device or data processing system through computer-readable signal media 826 for use within data processing system 800. For instance, program code stored in a computer-readable storage media in a data processing system may be downloaded over a network from the data processing system to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to, or in place of, those illustrated for data processing system 800. Other components shown in FIG. 8 can be varied from the illustrative examples shown. The different embodiments may be implemented using any hardware device or system capable of executing program code. As one example, data processing system 800 may include organic components integrated with inorganic components and/or may be comprised entirely of organic components excluding a human being. For example, a storage device may be comprised of an organic semiconductor.

As another example, a computer-readable storage device in data processing system 800 is any hardware apparatus that may store data. Memory 806, persistent storage 808, and computer-readable storage media 824 are examples of physical storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 806 or a cache such as found in an interface and memory controller hub that may be present in communications fabric 802.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, it should be understood that embodiments discussed herein are not limited to the particular features and processing steps shown. The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    receiving, from a number of data sources, data regarding choices of people at a number of specified events and public places;
    determining, by a number of processors, with a number of clustering algorithms, a number of trend clusters according to the data received from the data sources cross-referenced to defined event types and place types;
    receiving, from a number of registered customers through user interfaces, customer profile data and preferences;
    determining, by the number of processors, with a number of clustering algorithms, a number of customer clusters according to the customer profile data and preferences;
    deriving, by the number of processors, correlation rules between the trend clusters and the customer clusters;
    sending, by the number of processors according to the correlation rules, a number of trend predictions and recommendations to a user regarding a number of specified events or time frames;
    receiving, by the number of processors, feedback about fashion choices made by the user;
    updating, by the number of processors, the trend clusters and correlation rules according to the feedback; and
    refining, by the number of processors, future trend predictions and recommendations according to the feedback.

2. The method of claim 1, wherein sending trend predictions and recommendations further comprises:
    receiving, from a number of sensors, information about a number of clothing items in which the sensors are incorporated that are being tried on by a registered customer;
    determining in real time, by the number of processors according to the correlation rules, a number of clothing recommendations for the customer according to the correlation rules; and displaying, by the number of processors, the clothing recommendations to the customer through an interface.

3. The method of claim 2, further comprising:
receiving, from the registered customer through a user interface, indication to attend of a number of specified events;
determining, by the number of processors, if any other registered customers have indicated attendance of the specified events;
determining, by the number of processors, clothing selections of the other registered users attending the specified events; and
customizing, by the number of processors, the clothing recommendation to either follow or differ from clothing choices of other registered users attending the specified events, according to user preference.

4. The method of claim 1, wherein sending the trend predictions and recommendations further comprises providing, by the number of processors, promotion recommendations to retailers for a number of customer clusters.

5. The method of claim 1, wherein sending the trend predictions and recommendations further comprises providing, by the number of processors, clothing inventory recommendations to retailers.

6. The method of claim 1, wherein sending the trend predictions and recommendations further comprises providing, by the number of processors, manufacturing recommendations to a number of manufacturers.

7. The method of claim 1, wherein the clustering algorithms comprise at least one of:
k-means clustering;
mean-shift clustering;
density-based spatial clustering of applications with noise;
ordering points to identify a clustering structure;
expectation-maximization clustering;
Gaussian mixture models; or
hierarchical clustering.

8. The method of claim 1 wherein receiving feedback further comprises receiving updated data by the number of processors from the data sources regarding clothing choices of other registered users.

9. The method of claim 1, wherein the data sources comprise at least one of:
social media posts;
news media video and photographic sources; or
public video devices.

10. The method of claim 1, wherein the data sources comprise smart tags or haptic sensors in clothing, wherein the smart tags or sensors provide information comprising at least one of item type, material, color, manufacturer, product code, or retail price.

11. A computer program product, the computer program product comprising:
a non-volatile computer readable storage medium having program instructions embodied therewith, the program instructions executable by a number of processors to cause the computer to perform the steps of:
receiving, from a number of data sources, data regarding choices of people at a number of specified events and public places;
determining, with a number of clustering algorithms, a number of trend clusters according to the data received from the data sources cross-referenced to defined event types and place types;
receiving, from a number of registered customers, customer profile data and preferences;
determining, with the number of clustering algorithms, a number of customer clusters according to the customer profile data and preferences;
deriving correlation rules between the trend clusters and the customer clusters; and
sending, according to the correlation rules, a number of trend predictions and clothing recommendations to a user regarding a number of specified events or time frames,
wherein the instructions for sending trend predictions and clothing recommendations further comprise instructions for:
receiving, from a number of sensors, information about a number of clothing items in which the sensors are incorporated that are being tried on by a registered customer;
determining in real time, according to the correlation rules, a number of clothing recommendations for the customer according to the correlation rules; and
displaying the clothing recommendations to the customer through an interface.

12. The computer program product of claim 11, further comprising instructions for:
receiving, from the registered customer, indication to attend of the number of specified events;
determining if any other registered customers have indicated attendance of the specified events;
determining clothing selections of the other registered customers attending the specified events; and
customizing the clothing recommendation to either follow or differ from clothing choices of other registered customers attending the specified events, according to user preference.

13. The computer program product of claim 11, wherein the instructions for sending the trend predictions and recommendations further comprise instructions for providing promotion recommendations to retailers for a number of customer clusters.

14. The computer program product of claim 11, wherein the instructions for sending trend predictions and recommendations further comprise instructions for providing clothing inventory recommendations to retailers.

15. The computer program product of claim 11, wherein the instructions for sending trend predictions and recommendations further comprise instructions for providing manufacturing recommendations to a number of manufacturers.

16. The computer program product of claim 11, wherein the clustering algorithms comprise at least one of:
k-means clustering;
mean-shift clustering;
density-based spatial clustering of applications with noise;
ordering points to identify a clustering structure;
expectation-maximization clustering;
Gaussian mixture models; or
hierarchical clustering.

17. The computer program product of claim 11, further comprising instructions for updating the trend clusters and correlation rules according to customer feedback and updated data from the data sources regarding choices.

18. The computer program product of claim 11, wherein the data sources comprise at least one of:
social media posts;
news media video and photographic sources; or
public video devices.

19. The computer program product of claim 11, wherein the data sources comprise smart tags or haptic sensors in clothing, wherein the smart tags or sensors provide information comprising at least one of item type, material, color, manufacturer, product code, or retail price.

20. A system, comprising:
a bus system;
a storage device connected to the bus system, wherein the storage device stores program instructions; and
a number of processors connected to the bus system, wherein the number of processors execute the program instructions to:
 receive, from a number of data sources, data regarding choices of people at a number of specified events and public places;
 determine, with a number of clustering algorithms, a number of trend clusters according to data received from the data sources cross-referenced to defined event types and place types;
 receive, from a number of registered customers, customer profile data and preferences;
 determine, with the number of clustering algorithms, a number of customer clusters according to the customer profile data and preferences;
 derive correlation rules between the trend clusters and the customer clusters;
 send, according to the correlation rules, a number of trend predictions and clothing recommendations to a user regarding a number of specified events or time frames;
 receive feedback about fashion choices made by the user;
 update the trend clusters and correlation rules according to the feedback; and
 refine future trend predictions and recommendations according to the feedback.

21. The system according to claim 20, wherein the data sources comprise at least one of:
social media posts;
news media video and photographic sources; or
public video devices.

22. The system according to claim 20, wherein the data sources comprise smart tags or sensors in clothing, wherein the smart tags or sensors provide information comprising at least one of: item type, color, manufacturer, product code, or retail price.

* * * * *